(12) United States Patent
Saeki

(10) Patent No.: US 11,274,696 B2
(45) Date of Patent: Mar. 15, 2022

(54) FASTENING STRUCTURE

(71) Applicant: BOLT ENGINEER CO., Kobe (JP)

(72) Inventor: Hiroshi Saeki, Kobe (JP)

(73) Assignee: BOLT ENGINEER CO., Kobe (JP)

( * ) Notice: Subject to any disclaimer, the term of this patent is extended or adjusted under 35 U.S.C. 154(b) by 223 days.

(21) Appl. No.: 16/488,308

(22) PCT Filed: Mar. 21, 2017

(86) PCT No.: PCT/JP2017/011083
§ 371 (c)(1),
(2) Date: Aug. 23, 2019

(87) PCT Pub. No.: WO2018/154795
PCT Pub. Date: Aug. 30, 2018

(65) Prior Publication Data
US 2019/0376547 A1  Dec. 12, 2019

(30) Foreign Application Priority Data

Feb. 24, 2017  (JP) .............................. JP2017-033748

(51) Int. Cl.
*F16B 39/02* (2006.01)
*F16B 37/04* (2006.01)
*F16B 39/12* (2006.01)

(52) U.S. Cl.
CPC .......... *F16B 39/028* (2013.01); *F16B 37/042* (2013.01); *F16B 39/12* (2013.01); *F16B 39/02* (2013.01)

(58) Field of Classification Search
CPC ........ F16B 39/028; F16B 39/04; F16B 39/06; F16B 39/282; F16B 37/042; F16B 39/02; F16B 39/12

(Continued)

(56) References Cited

U.S. PATENT DOCUMENTS 1,033,585 A * 7/1912 Hickey .................. F16B 39/24
 411/145
1,172,669 A * 2/1916 Caldwell ................ F16B 39/06
 411/432

(Continued)

FOREIGN PATENT DOCUMENTS

CN 202326625 U * 7/2012
DE 2811108 A1 * 9/1979 .............. F16B 39/24

(Continued)

OTHER PUBLICATIONS

International Search Report dated May 30, 2017, issued in counterpart International Application No. PCT/JP2017/011083 (2 pages).

*Primary Examiner* — Roberta S Delisle
(74) *Attorney, Agent, or Firm* — Westerman, Hattori, Daniels & Adrian, LLP

(57) ABSTRACT

A fastening structure inserts a threaded rod 11*a* of a bolt 11 through a fixing hole 12*a* of a to-be-fixed member 12 in a manner such that an end portion of the threaded rod protrudes from the fixing hole, and screwing a machine screw 15 with a proper torque into a nut 14 which is provided on the end portion via a washer 13. The washer has an inclined surface 13*c* formed on a first side 13*b* which faces the nut, and has a flat surface formed on a second side 13*d*. The machine screw is screwed into the nut in a direction such that an axis is orthogonal to the inclined surface 13*c*. The first side (the inclined surface) and the second side of the washer have a different surface roughness, and the first side has a smaller coefficient of friction than the second side.

6 Claims, 16 Drawing Sheets

(58) Field of Classification Search
USPC .................................. 411/149, 274–275, 286
See application file for complete search history.

(56) References Cited

U.S. PATENT DOCUMENTS

| | | | | |
|---|---|---|---|---|
| 1,850,917 A * | 3/1932 | Browne | .................. | F16B 39/12 411/230 |
| 3,329,190 A * | 7/1967 | Oldenkott | ............... | F16B 39/24 411/136 |
| 4,010,669 A * | 3/1977 | Kloren | .................. | F16B 39/028 411/544 |
| 5,083,889 A * | 1/1992 | Steinbock | ............ | B21B 27/035 403/320 |
| 5,090,855 A * | 2/1992 | Terry | ...................... | F16B 39/24 29/525.02 |
| 5,314,279 A * | 5/1994 | Ewing | .................. | F16B 39/282 411/134 |
| 5,622,465 A * | 4/1997 | Junkers | .................. | F16B 39/08 411/432 |
| 5,626,449 A * | 5/1997 | McKinlay | ............. | F16B 39/282 411/136 |
| 6,112,396 A * | 9/2000 | Steinbock | ............. | B23P 19/067 29/452 |
| 6,758,646 B1 * | 7/2004 | Ishida | ................... | F16B 39/028 411/119 |
| 2004/0047706 A1 * | 3/2004 | Chang | .................. | F16B 39/282 411/161 |
| 2006/0216129 A1 * | 9/2006 | Lin | ....................... | F16B 39/282 411/161 |
| 2007/0243040 A1 * | 10/2007 | Chen | ..................... | F16B 39/282 411/161 |
| 2010/0098511 A1 * | 4/2010 | Andersson | ............ | F16B 39/282 411/149 |
| 2014/0017028 A1 * | 1/2014 | McKinlay | ............. | F16B 39/282 411/149 |
| 2014/0037399 A1 * | 2/2014 | Hyatt | .................... | F16B 43/009 411/87 |
| 2015/0354618 A1 * | 12/2015 | Kim | ........................ | F16B 39/28 411/81 |
| 2016/0003287 A1 * | 1/2016 | Andersson | .............. | F16B 39/24 411/149 |
| 2016/0160904 A1 * | 6/2016 | Lee | ........................ | F16B 39/282 411/332 |
| 2019/0234446 A1 * | 8/2019 | Chang | .................... | F16B 39/24 |
| 2021/0239151 A1 * | 8/2021 | Saeki | ..................... | F16B 39/24 |

FOREIGN PATENT DOCUMENTS

| | | | | |
|---|---|---|---|---|
| EP | 0418002 A1 * | 3/1991 | .......... | F16B 39/2825 |
| EP | 3106682 A1 * | 12/2016 | ............. | F16B 31/04 |
| IT | VI20110204 A1 * | 1/2013 | ............ | F16B 1/0071 |
| JP | 49086 Z1 | 6/1919 | | |
| JP | 344911 Z1 | 12/1944 | | |
| JP | 54-38462 A | 3/1979 | | |
| JP | 60-191710 U | 12/1985 | | |
| JP | 5-506708 A | 9/1993 | | |
| JP | 2009-293793 A | 12/2009 | | |
| JP | 2010-502904 A | 1/2010 | | |
| JP | 2011-179679 A | 9/2011 | | |
| WO | 01/88391 A1 | 11/2001 | | |

* cited by examiner

FASTENING STRUCTURE

TECHNICAL FIELD

The present invention relates to a fastening structure with a nut and a bolt.

BACKGROUND ART

Conventionally various practical anti-loosening devices have been provided such as a spring washer, double nuts, a split pin penetrated through a nut and bolt, for example. However, they are not sufficiently effective to prevent loosening caused by vibration or the like, and expensive because of the complex mechanism and machining.

Thus, a locking pin mechanism is proposed, in which a locking pin is inserted into a hole provided on an internal surface of a nut for expanding the internal surface of the nut to generate anti-loosening pressure; and another locking pin mechanism is also proposed, in which a locking pin insertion hole penetrating through a nut is formed slightly apart from an internal surface of the nut in an inclined direction, a locking pin, which is slightly longer than the locking pin insertion hole and has a sharp end, is inserted into the hole, the nut is fitted onto an external thread of a bolt and turned by hand until the nut reaches a washer, then the nut is strongly turned with a wrench or other commercially available tools to fasten an object between two washers, and when the nut is more strongly turned, the locking pin is pushed by the washer to firmly contact and press the external thread at the end thereof, by which the anti-loosening effect is generated, and further when the nut is still more strongly turned, the end of the locking pin digs into the external thread like a peg, by which greater anti-loosening effect is generated (See PLT 1, 2, for example).

CITATION LIST

Patent Literature

[PLT 1] Japanese Patent Application Publication No. 2009-293793
[PLT 2] Japanese Patent Application Publication No. 2011-179679

SUMMARY OF INVENTION

Technical Problem

The locking pin mechanism of PLT 1 is to expand the internal surface of the nut for fastening, and that of PLT 2 is to make the end of the locking pin dig into a threaded rod of the bolt for fastening. Therefore, the threaded rod (thread portion) is damaged and cannot be reused when the nut is loosened for maintenance or other purposes.

The present invention provides a fastening structure that does not loosen in a fastened state but can be easily loosened for maintenance, and allows reuse of bolts and nuts.

Solution to Problem

The first aspect of the present application is a fastening structure for fixing an object to a to-be-fixed member by inserting a threaded rod of a bolt for fixing the object through a fixing hole of the to-be-fixed member in a manner such that an end portion of the threaded rod protrudes from the fixing hole, and screwing a machine screw with a proper torque into a nut which is provided on the end portion via a washer, wherein the washer has an inclined surface formed on a first side thereof which faces the nut, and has a flat surface formed on a second side thereof which is opposite to the first side; the inclined surface is formed so as to have a gradually decreasing height in a tightening direction of the nut; the machine screw is screwed into the nut in a direction such that an axis thereof is orthogonal to the inclined surface, and the machine screw has an end which protrudes to contact the inclined surface; and the inclined surface has a smaller coefficient of friction than the second side of the washer.

In this fastening structure, since the machine screw is screwed into the nut in a direction such that the axis thereof is orthogonal to the inclined surface on the first side of the washer, the threaded rod (threaded portion) of the bolt is not damaged and can be reused. Further, if the nut tries to turn in a loosening direction due to vibration or the like, as the inclined surface has a smaller coefficient of friction than the second side, the machine screw is forced to climb the inclined surface to generate a force to press the washer against the to-be-fixed member, thereby preventing the nut from loosening.

In the second aspect, preferably the inclined surface has a smaller surface roughness than the second side, that is, the inclined surface is of normal finishing, and the second side is of rough finishing.

In this fastening structure, slip between the inclined surface and the end of the machine screw precedes that between the second side of the washer and the to-be-fixed member. As a result, the washer is forced to press against the to-be-fixed member.

In these cases, it is preferable that the machine screw has a flat surface at the end thereof and makes face-contact with the inclined surface, in the third aspect.

In the fourth aspect, it is preferable that the machine screw is screwed so as to be tilted against the axis of the nut by an angle corresponding to an inclination angle of the inclined surface.

In the fifth aspect, it is preferable that the inclined surface is formed at two or more places in a circumferential direction around a center hole of the washer.

Moreover, in the sixth aspect, it is preferable that the nut is provided with the machine screws, each end of them protruding by the same length.

This fastening structure enables to eliminate a troublesome work of screwing every machine screw one by one for fastening the bolt and nut, and greatly simplify a fastening work.

In this case, in the seventh aspect, it is preferable that the second side of the washer is formed uneven so as to have a small resistance in the tightening direction and a large resistance in a loosening direction.

Further, instead of making the end of the machine screw directly contact the washer, it is also possible to make it indirectly contact the washer by providing an intermediate cradle therebetween as the seventh and eighth aspects.

The eighth aspect is a fastening structure for fixing an object to a to-be-fixed member by inserting a threaded rod of a bolt for fixing the object through a fixing hole of the to-be-fixed member in a manner such that an end portion of the threaded rod protrudes from the fixing hole, and applying a nut to the end portion via a washer, wherein the washer has an inclined surface formed on a first side thereof which faces the nut, and has a flat surface formed on a second side thereof which is opposite to the first side; the inclined surface is formed so as to have a gradually decreasing height in a tightening direction of the nut; a machine screw is screwed into the nut in a direction such that an axis thereof is orthogonal to the inclined surface, and an end of the machine screw presses the inclined surface via an intermediate cradle; and the intermediate cradle has a flat surface formed on one side thereof which comes in contact with the machine screw, and has an inclined surface formed on a side opposite to the side where the machine screw contacts, having a smaller coefficient of friction than the second side of the washer, and having a shape corresponding to the inclined surface of the washer.

The ninth aspect is a fastening structure for fixing an object to a to-be-fixed member by inserting a threaded rod of a bolt for fixing the object through a fixing hole of the to-be-fixed member in a manner such that an end portion of the threaded rod protrudes from the fixing hole, and screwing a machine screw with a proper torque into a nut which is provided on the end portion via a washer, wherein the machine screw is screwed into the nut and an end of the machine screw presses the washer via an intermediate cradle; and the intermediate cradle is formed in a manner such that one side thereof which comes in contact with the machine screw has a gradually decreasing height in a tightening direction of the nut, and a smaller coefficient of friction than a second side of the washer, and that the other side thereof opposite to the side which comes in contact with the machine screw has a flat surface.

Furthermore, a fastening structure is applicable not only between the nut and washer but also between a bolt head and washer in the tenth aspect.

The tenth aspect is a fastening structure for fixing an object to a to-be-fixed member by inserting a threaded rod of a bolt for fixing the object through a fixing hole of the to-be-fixed member via a washer in a manner such that an end portion of the threaded rod protrudes from the fixing hole, wherein the washer has an inclined surface formed on a first side thereof which faces the nut, and has a flat surface formed on a second side thereof which is opposite to the first side; the inclined surface is formed so as to have a gradually decreasing height in a tightening direction of the bolt; a machine screw is screwed into a head of the bolt in a direction such that an axis thereof is orthogonal to the inclined surface, and the machine screw has an end which comes in contact with the inclined surface; and the inclined surface has a smaller coefficient of friction than the second side of the washer.

Effects of Invention

In the present invention, since the machine screw is screwed into the nut or the head of the bolt in a manner such that the axis thereof is orthogonal to the inclined surface, hole machining is simplified and the threaded rod (threaded portion) of the bolt is not damaged and therefore reusable. Even when the nut and bolt try to rotate in a loosening direction due to vibration or the like, as the inclined surface and the second side of the washer have a different coefficient of friction, the move of the machine screw can press the washer against the to-be-fixed member, and prevent them from loosening.

DESCRIPTION OF EMBODIMENTS

Hereinafter, embodiments of the invention will be explained with reference to the drawings.

Figure 1:
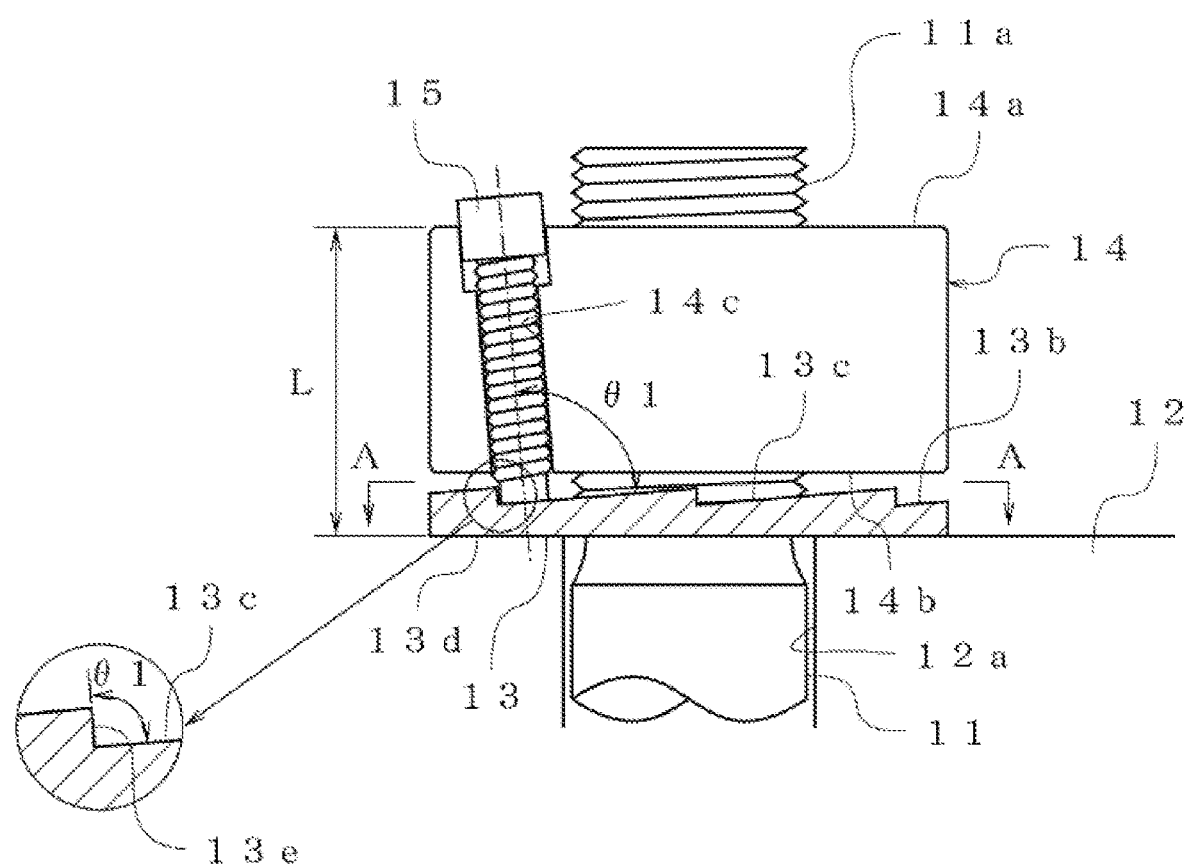
FIG. 1 is a cross-sectional view showing a fastening structure according to the invention.
Figure 2:
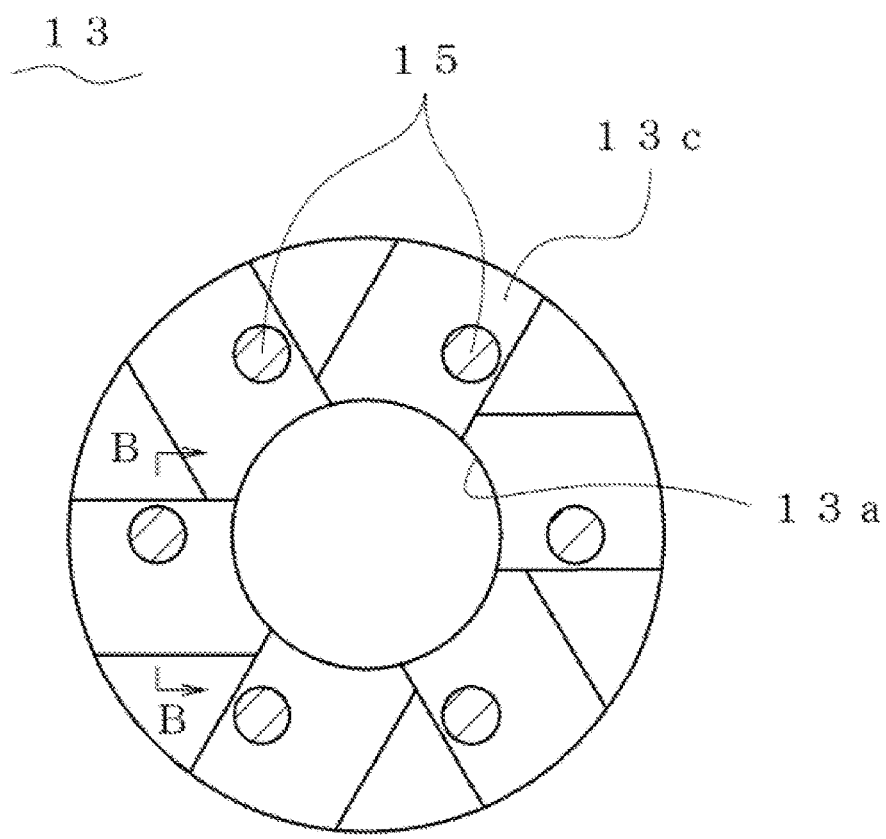
FIG. 2 is a view on the arrow of the line A-A in FIG. 1.
Figure 3:
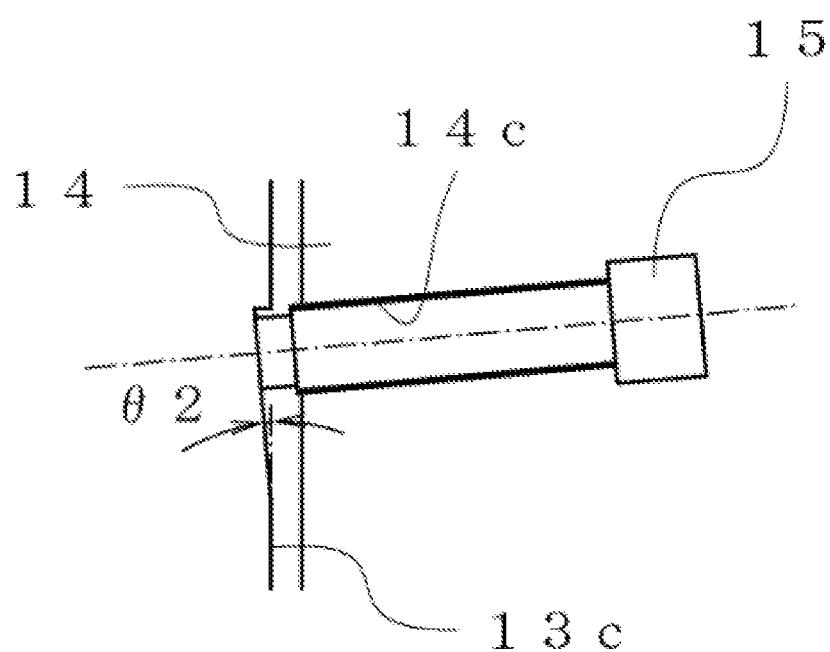
FIG. 3 is a cross-sectional view taken along the line B-B in FIG. 2.

FIG. 1 is a cross-sectional view showing a fastening structure according to the invention, and FIG. 2 is a view on the arrow of the line A-A in FIG. 1.

As shown in FIG. 1 and FIG. 2, the fastening structure of the invention is a fastening structure for fixing an object (not shown) to a to-be-fixed member 12 by inserting a threaded rod 11a of a bolt 11 for fixing the object to the to-be-fixed member 12 through a fixing hole 12a of the to-be-fixed member 12 in a manner such that an end portion of the threaded rod 11a protrudes from the fixing hole 12a, and applying a nut 14 to the end portion via a washer 13. Here, the bolt 11 has a screw diameter of 20 mm to 1000 mm, for example.

In this fastening structure, with the relation between the nut 14 and the washer 13, the nut 14 will not naturally loosen even if subjected to vibration or the like, but can be easily loosened by a hand wrench alone if necessary for maintenance.

The washer 13 has a center hole 13a through which the threaded rod 11a is inserted. The washer 13 has multiple inclined surfaces 13c formed on a first side 13b which faces the nut 14. In other word, multiple angled protrusions are formed on the first side of the washer 13, which are disposed along a circumferential direction around the center hole 13a. On the other hand, a second side 13d is formed flat.

The inclined surface 13c is continuous with a wall 13e rising at a nut 14 tightening direction end. The inclined surface 13c and the wall 13e are orthogonal to each other (□1=90°). The inclined surface 13c is inclined at an angle about □2=3° to 20° with respect to the second side 13d.

The first side 13b (the inclined surface 13c) and the second side 13d of the washer 13 have different surface roughness so that they have a different coefficient of friction. The inclined surface 13c is finished smoother than the second surface 13d so as to have a smaller coefficient of friction. For example, the inclined surface 13c is of normal finishing and the second side 13d is of rough finishing.

Figure 4:
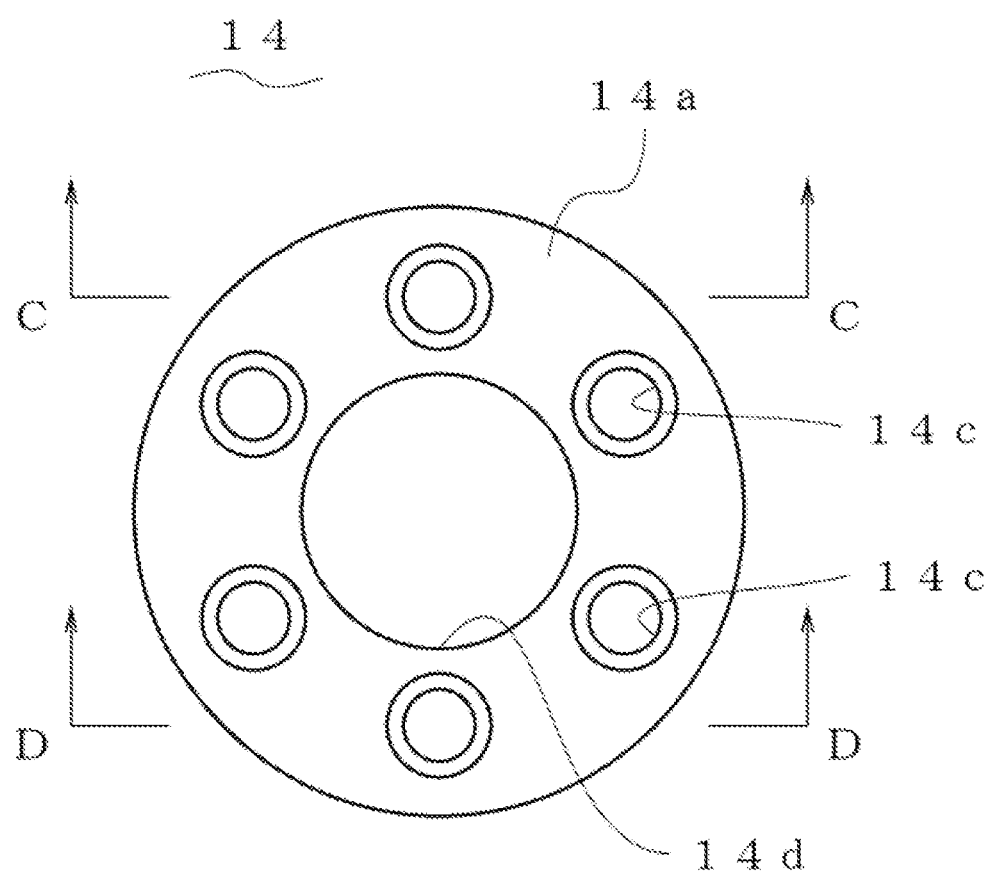
FIG. 4 is a plan view of a nut used for the fastening structure according to the invention.
Figure 5:
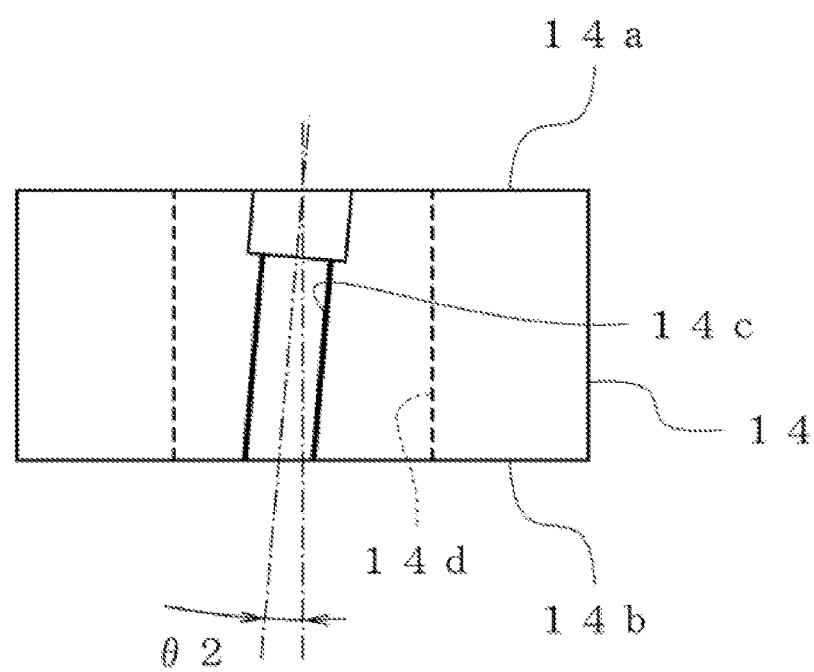
FIG. 5 is a cross-sectional view taken along the line C-C in FIG. 4.
Figure 6:
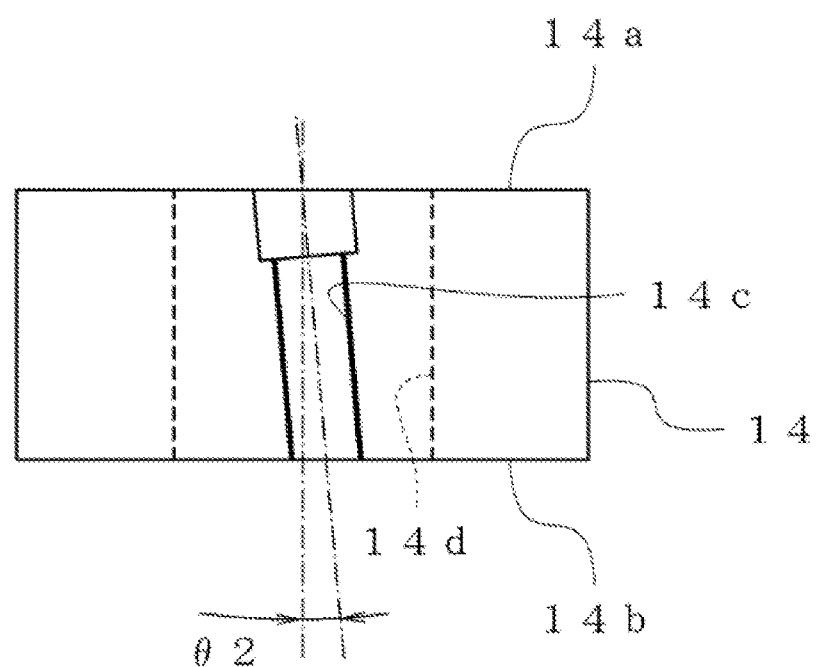
FIG. 6 is a cross-sectional view taken along the line D-D in FIG. 4.
Figure 7:
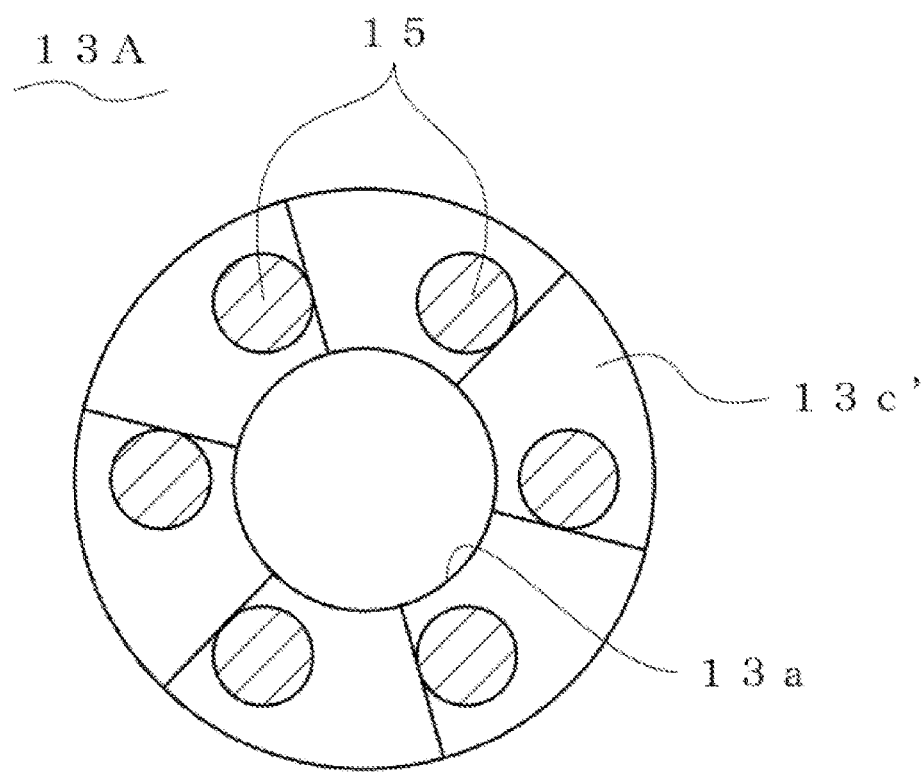
FIG. 7 is a plan view showing a modified example of a washer.

The nut 14 has multiple inclined threaded holes 14c formed around a center hole 14d (See FIG. 4) in a circumferential direction corresponding to the inclined surface 13c, which are inclined along the circumference from an upper surface 14a to a lower surface 14b with respect to a center axis of the bolt 11. A machine screw 15 is applied to the inclined treaded hole 14c of the nut 14 to be screwed, when an axis of the machine screw 15 is positioned orthogonal to the inclined surface 13c. The machine screw 15 has an end which is flat and in face-contact with the inclined surface 13c.

In this structure, when the nut 14 tries to rotate in a loosening direction (i.e. in the anti-clockwise direction) due to vibration or the like, the machine screw 15 moves on the inclined surface 13c of the washer 13 in a climbing direction. As a result, a length L between the upper surface 14a of the nut 14 and the second surface 13d of the washer 13 tries to increase.

At this time, since the first side 13b and second side 13d of the washer 13 have a different coefficient of friction, slip between the inclined surface 13c of the washer 13 having a smaller coefficient of friction and the end of the machine screw 15 precedes that between the second side 13d and the to-be-fixed member 12. When the slip starts even a little, the length L become longer, so that the second side 13d of the washer 13 is more strongly pressed against a seat (the to-be-fixed member 12) and becomes less slippery.

As the inclination angle of the inclined surface 13c increases, the second side 13d of the washer 13 is still more strongly pressed against the seat. This further increases the friction and makes it harder to rotate. That is, the nut 14 will not come loose.

As an example, under the condition that the bolt 11 has a diameter of 36 mm (M 36), a length of five times the diameter (180 mm) and a bolt axial force (a bolt tension) of 350 kN, and the inclined surface 13c of the washer 13 has an slant depth of 0.6 mm, a force (i.e. an axial force or a rotation torque) to (forcefully) loosen the nut 14 will be 196% (about doubled) for fastening force of 100.

Where the bolt 11 has a diameter of 64 mm and a bolt axial force of 1150 kN, and other conditions are the same, a force to loosen the nut 14 will be 153% (about 1.5 times).

The force to loosen the nut 14 varies with a slant depth of the inclined surface 13c on the washer 13 (a height of the wall 13e), and the deeper the depth, the greater the force (the axial force or rotation torque for loosening) required.

The fact that 153% to 196% force is required to forcefully loosen the nut 14 is the same as the nut 14 will not loosen. This is because bolts are generally tightened with 60% to 90% of yield point, and may be broken before loosening when a loosening torque (or an axial force) about twice is applied.

Nevertheless, generally the nut 14 is required to be (easily) loosened for maintenance or the like. In other words, a conflicting performance is required such that every nut should never loosen but can be easily loosened if necessary.

This fastening structure perfectly meets the above requirements, in which the nut 14 will not naturally loosen even if subjected to vibration or the like because of the relation between the nut 14 and the washer 13. On the other hand, if it is necessary to loosen the nut 14 for maintenance, the nut 14 can be easily loosened by a hand wrench, for example. In other words, when the machine screw 15 is loosened by a hand wrench, the nut 14 can be easily loosened even though having been tightened slightly harder from the beginning.

The present invention is not limited to the above-mentioned embodiment but has the other embodiments as follows.

(i) In the above-mentioned embodiment the inclined surfaces 13c having a certain width are disposed in the circumferential direction, whereas it is also possible to dispose fan-shaped inclined surfaces 13c' in the circumferential direction.

Figure 8:
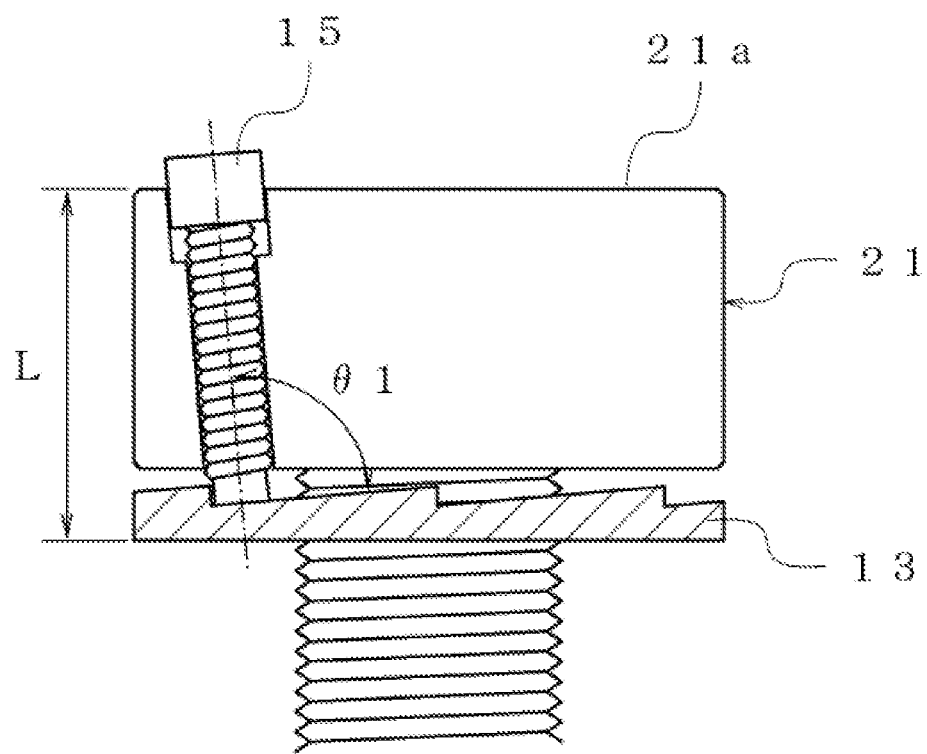
FIG. 8 shows another embodiment illustrated like FIG. 1, which is applied to a head of a headed bolt instead of the nut.

(ii) The above-mentioned embodiment is the fastening structure using the relation between the nut and washer, whereas it is also possible to apply the fastening structure to a relation between a head 21a of a headed bolt 21 and the washer 13 as shown in FIG. 8, for example. In this case, the cross section of the head 21a of the headed bolt 21 is not limited to a hexagon, but may be a circle.

Figure 9:
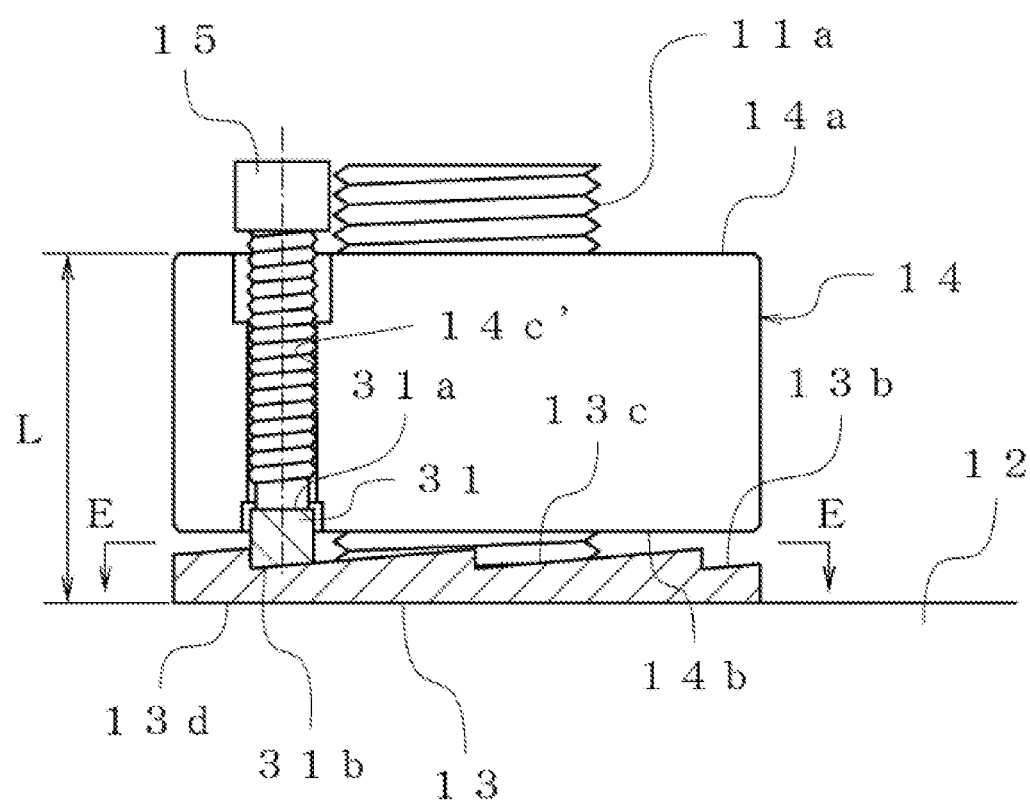
FIG. 9 shows still another embodiment illustrated like FIG. 1.
Figure 10:
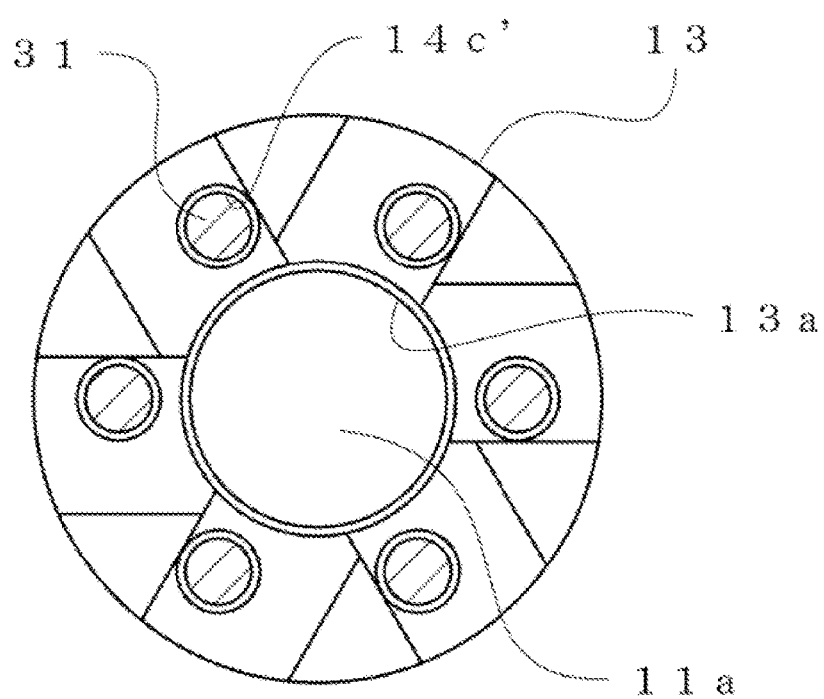
FIG. 10 is a cross-sectional view taken along the line E-E in FIG. 9.
Figure 11A:
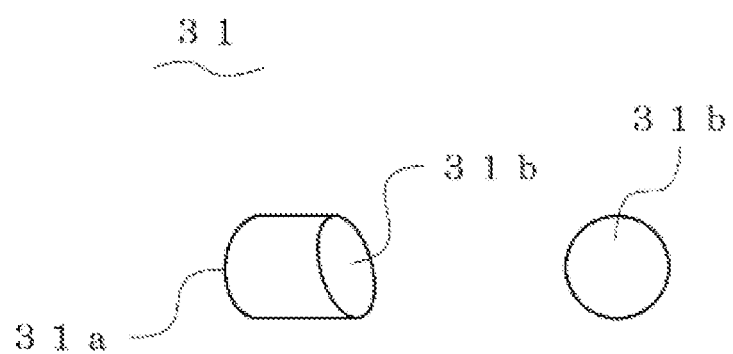
FIG. 11(a) and FIG. 11(b) respectively show an intermediate cradle.
Figure 11B:
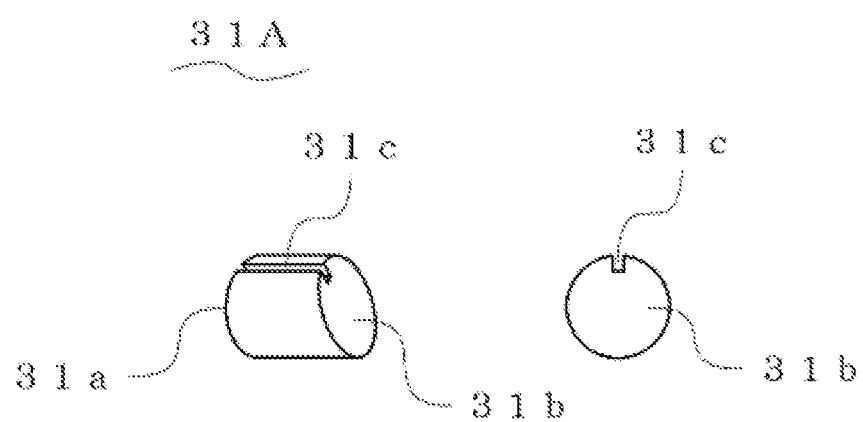

(iii) In the above-mentioned embodiment the inclined surface 13c is directly formed on the first side 13b of the washer 13, whereas it is also possible to fasten via an intermediate cradle 31 as shown in FIG. 9 and FIG. 10. As shown in FIG. 11(a), one side 31a of the intermediate cradle 31, which comes in contact with the end of the machine screw 15, has a flat surface (a horizontal surface), and the other side 31b has an inclined surface corresponding to the inclination of the inclined surface 13c of the washer 13, so that the machine screw 15 can be screwed without inclined. In this case, it is also possible to employ an intermediate cradle 31A provided with a rotation blocking groove 31c as shown in FIG. 11(b). The groove 31c may be also used for positioning.

Figure 12:
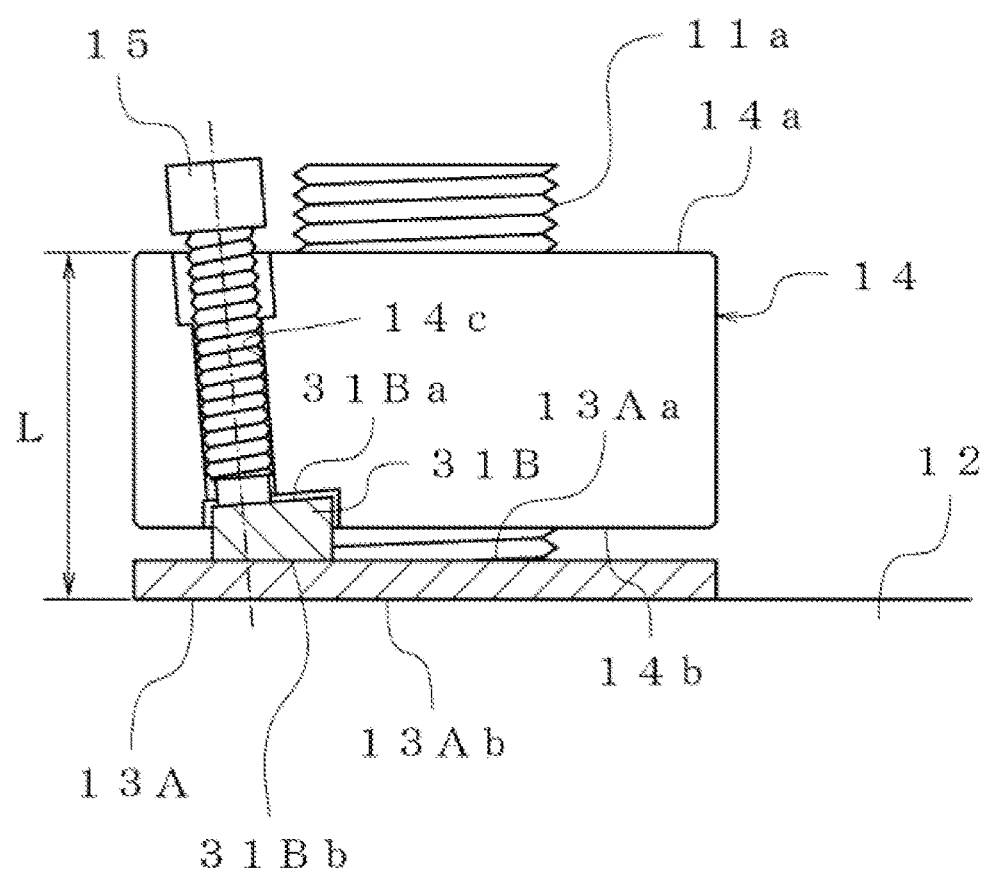
FIG. 12 shows still another embodiment illustrated like FIG. 1.
Figure 13:
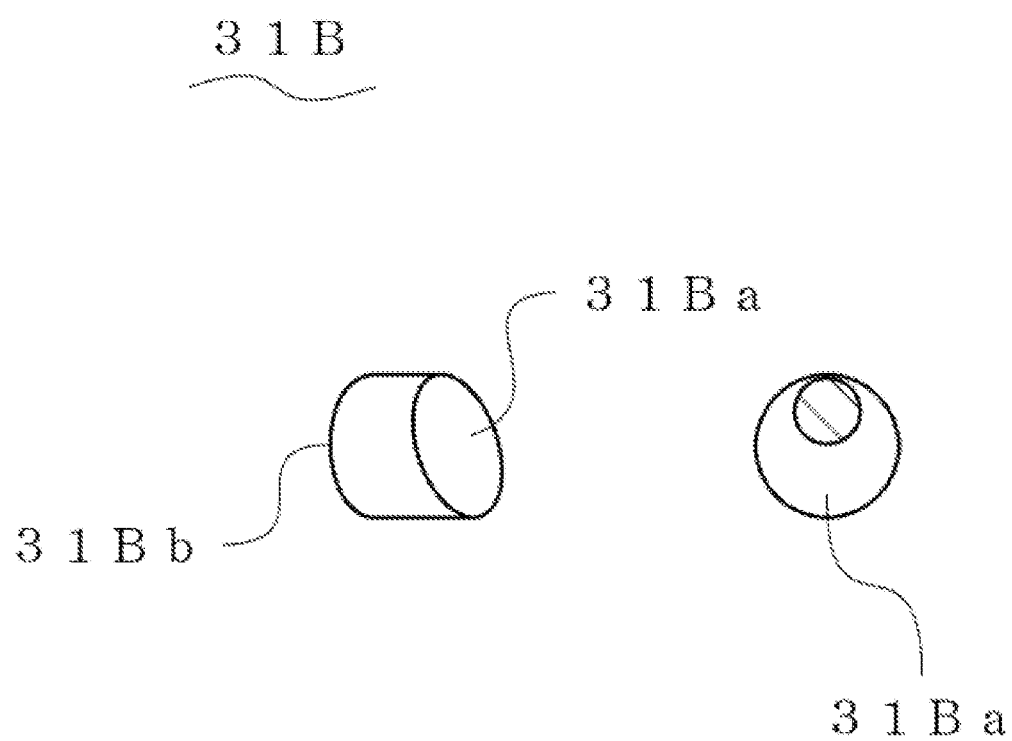
FIG. 13 shows an intermediate cradle.

(iv) As shown in FIG. 12, it is also possible to make the end of the machine screw 15 come in contact with an inclined surface 13Ba as one side of an intermediate cradle 31B mounted on a first side 13Aa of a washer 13A. In this case, the first side 13Aa and a second side 13Ab of the washer 13A have a flat surface, and as shown in FIG. 13, one side 13Ba of the cylindrical intermediate cradle 31B, with which the end of the machine screw 15 comes in contact, has an inclined surface. The contact area of the end of the machine screw is the hatched area. The inclined surface has a smaller coefficient of friction than the second side 13Ab of the washer 13A, and the intermediate cradle 31B is arranged on the first side 13Aa of the washer 13A in a manner such that the inclined surface can have a decreasing height in the tightening direction of the nut 14.

(v) In the above-mentioned embodiment, the basic principle of the fastening structure of the invention is to screw the machine screw 15 into the nut 14 with a uniform force (torque or axial force) rather than rotating the nut 14 in order to tighten the bolt 11 and the nut 14. However, it is also possible to use the principle in reverse.

Figure 14:
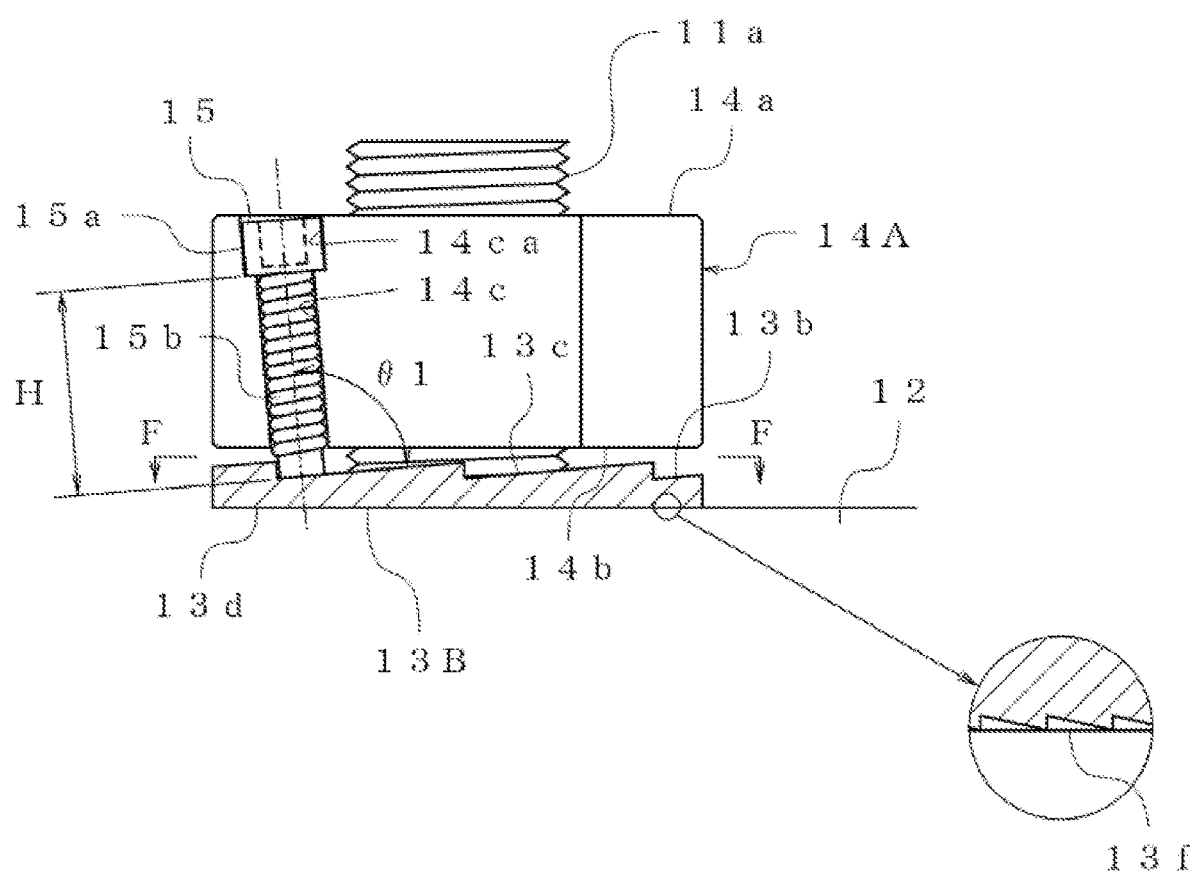
FIG. 14 shows still another embodiment illustrated like FIG. 1.
Figure 15:
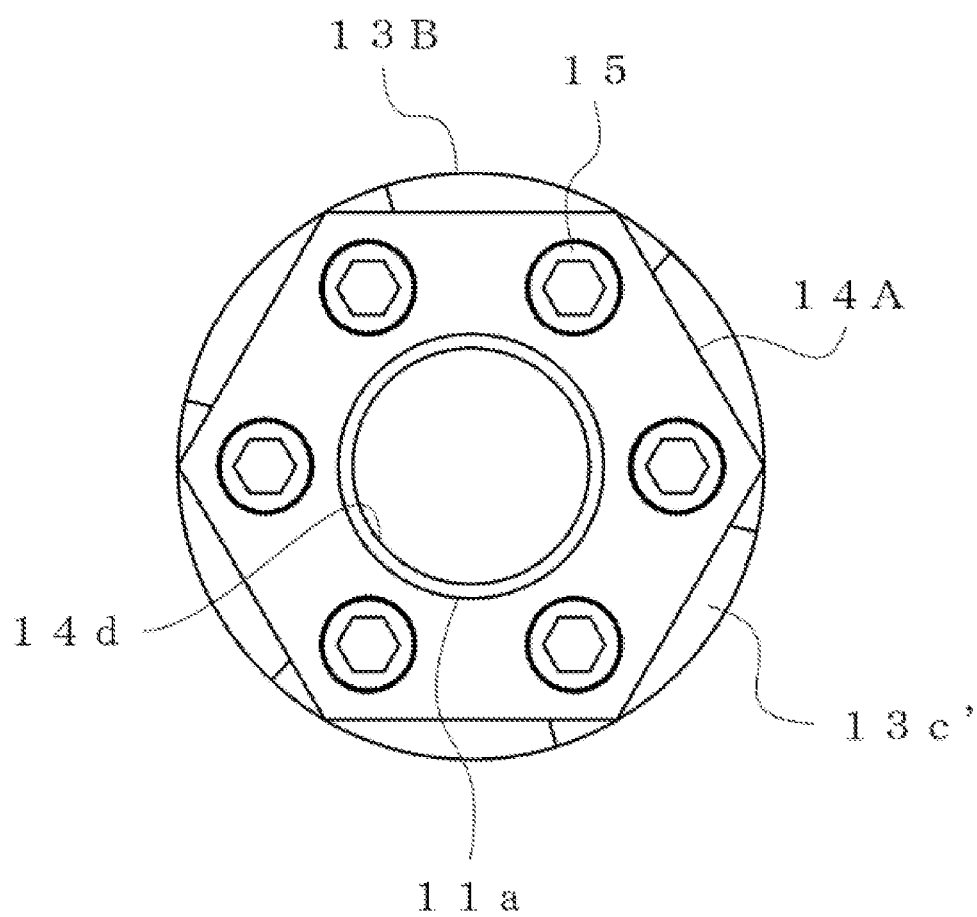
FIG. 15 is a plan view of the fastening structure shown in FIG. 14.
Figure 16:
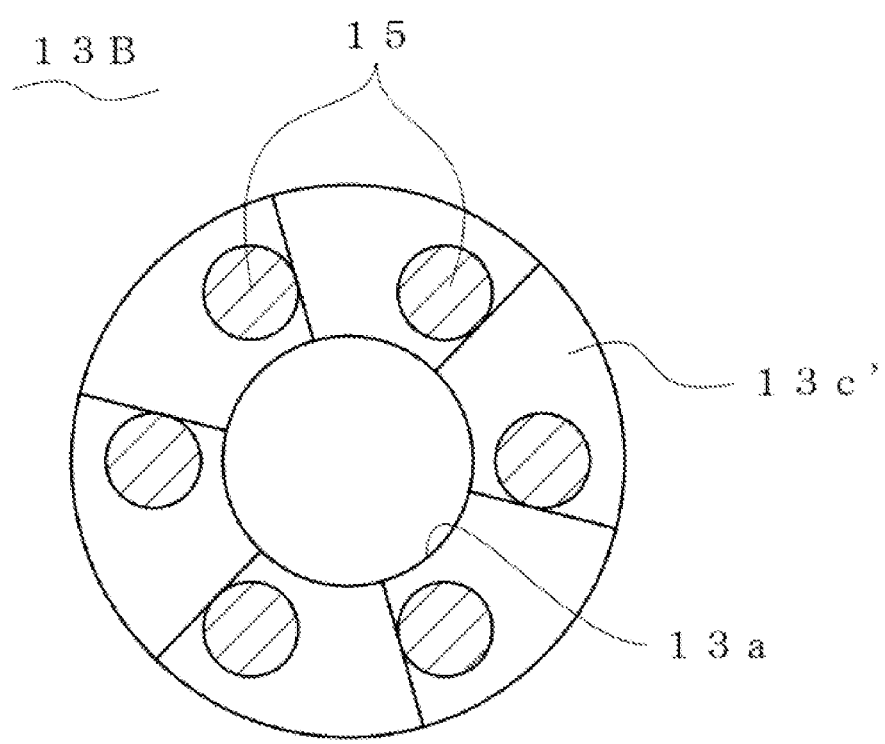
FIG. 16 is a cross-sectional view taken along the line F-F in FIG. 14.

As shown in FIG. 14 to FIG. 16, for example, to screw every machine screw 15 into a nut 14A so as to protrude by the same length from a lower surface 14b of the nut 14A in advance before rotating the nut 14A for tightening leads to the same result as to screw every machine screw 15 with the uniform force. In this example, in order to make it easy to rotate (tighten) the nut 14A with a tool, the nut 14A has a hexagonal cross section, for example. It should be noted that the machine screw 15 has a head 15a and a threaded portion 15b of length H. The protruding length of the end of the machine screw 15 (the end of the threaded portion 15b) from the lower surface 14b is regulated by the engagement between the head 15a and a step 14ca of the inclined screw hole 14c. Thus every machine screw 15 can be attached so as to protrude by the same length from the lower surface 14b of the nut 14A in advance.

In this structure, when the nut 14A is tightened, the nut A and the washer 13B rotate together, and the end of the machine screw 15 is tightened to the threaded rod 11a of the bolt 11 while being caught in a step provided by the wall 13e of the washer 13. Here, an uneven shape 13f (a jagged shape, for example) is formed on the second side 13d as a lower surface of the washer 13B, so as to provide a small resistance in the tightening direction and a large resistance in the loosening direction.

The nut 14A in this fastening structure will not loosen on the same principle as mentioned above. Additionally this structure enables to eliminate a troublesome work of screwing every machine screw one by one for tightening the bolt 11 and the nut 14A, and greatly simplify a fastening work. Therefore, even in the case there are many fastening points, the fastening work can be carried out in a short time by just tightening the nut 14A with a power tool or the like, that increases practical value as a fastening structure which is easy to tighten and prevents a nut from loosening.

(vi) The machine screw 15 has a flat end, but the same effect can be obtained when the machine screw is formed to have a hemispherical end, the inclined surface is formed to have a groove of semicircular cross section provided along the inclined surface, and the machine screw is screwed vertically without inclined at an angle.

REFERENCE SIGNS LIST

11 Bolt
11a Threaded rod
12 To-be-fixed member
12a Fixing hole
13, 13A, 13B Washer
13a Center hole
13b, 13Aa First side
13c, 13c', 13Ba Inclined surface
13d, 13Ab Second side
13e Wall
13f Uneven shape
14, 14A Nut
14a Upper surface
14b Lower surface
14c Inclined treaded hole
14ca Step
14d Center hole
15 Machine screw
15a Head
15b Threaded portion
21 Headed bolt
21a Head
31, 31A, 31B Intermediate cradle
31a, 31Ba One side
31b, 31Bb Other side
31c Rotation blocking groove

What is claimed is:

1. A fastening structure for fixing an object to a to-be-fixed member by inserting a threaded rod of a bolt for fixing the object through a fixing hole of the to-be-fixed member in a manner such that an end portion of the threaded rod protrudes from the fixing hole, and screwing a machine screw with a proper torque into a nut which is provided on the end portion via a washer, wherein
    the washer has an inclined surface formed on a first side thereof which faces the nut, and has a flat surface formed on a second side thereof which is opposite to the first side;
    the inclined surface is formed so as to have a gradually decreasing height in a tightening direction of the nut, wherein the tightening direction of the nut is a rotational direction of the nut about an axis of the bolt;
    the machine screw is screwed into the nut in a direction such that an axis thereof is orthogonal to the inclined surface, and the machine screw has an end which protrudes to contact the inclined surface; and
    the inclined surface has a smaller coefficient of friction than the second side of the washer.

2. The fastening structure according to claim 1 wherein the machine screw has a flat surface at the end thereof and makes face-contact with the inclined surface.

3. The fastening structure according to claim 2 wherein the machine screw is screwed so as to be tilted against the axis of the nut by an angle corresponding to an inclination angle of the inclined surface.

4. The fastening structure according to claim 1 wherein the inclined surface is formed at two or more places in a circumferential direction around a center hole of the washer.

5. The fastening structure according to claim 1 wherein the second side of the washer is formed uneven so as to have a first resistance in the tightening direction and a second resistance in a loosening direction, the first resistance being smaller than the second resistance.

6. A fastening structure for fixing an object to a to-be-fixed member by inserting a threaded rod of a bolt for fixing the object into a fixing hole of the to-be-fixed member via a washer, wherein
    the washer has an inclined surface formed on a first side thereof which faces a head of the bolt, and has a flat surface formed on a second side thereof which is opposite to the first side;
    the inclined surface is formed so as to have a gradually decreasing height in a tightening direction of the bolt;
    a machine screw is screwed into the head of the bolt in a direction such that an axis thereof is orthogonal to the inclined surface, and the machine screw has an end which comes in contact with the inclined surface; and
    the inclined surface has a smaller coefficient of friction than the second side of the washer,
    wherein the tightening direction of the bolt is a rotational direction of the bolt about an axis of the bolt.

* * * * *